(12) United States Patent
Pai et al.

(10) Patent No.: US 7,751,315 B1
(45) Date of Patent: Jul. 6, 2010

(54) SHARED NETWORK PATH CONTENTION REDUCTION

(75) Inventors: Sukesh H. Pai, Sunnyvale, CA (US); Wallace C. Colyer, Los Gatos, CA (US); Vivek Thukral, Palo Alto, CA (US); Leslie H. Thaler, Los Gatos, CA (US)

(73) Assignee: Microsoft Corporation, Redmond, WA (US)

( * ) Notice: Subject to any disclaimer, the term of this patent is extended or adjusted under 35 U.S.C. 154(b) by 2120 days.

(21) Appl. No.: 10/620,143

(22) Filed: Jul. 15, 2003

(51) Int. Cl.
*H04L 12/26* (2006.01)
*H04J 3/16* (2006.01)
*H04N 7/173* (2006.01)

(52) U.S. Cl. .................... 370/230; 370/395.4; 370/412; 370/468; 725/115; 725/145

(58) Field of Classification Search ................. 370/230, 370/395.4, 412, 468; 725/115, 145
See application file for complete search history.

(56) References Cited

U.S. PATENT DOCUMENTS

| 5,586,121 | A | * | 12/1996 | Moura et al. ................ 370/404 |
| 5,757,784 | A | * | 5/1998 | Liebowitz et al. ........... 370/321 |
| 5,805,804 | A | * | 9/1998 | Laursen et al. .............. 709/223 |
| 5,881,050 | A | | 3/1999 | Chevalier et al. |
| 6,137,793 | A | * | 10/2000 | Gorman et al. ............. 370/360 |
| 6,262,974 | B1 | | 7/2001 | Chevalier et al. |
| 6,411,982 | B2 | * | 6/2002 | Williams .................... 718/102 |
| 6,430,562 | B1 | * | 8/2002 | Kardos et al. ...................... 1/1 |
| 6,438,704 | B1 | * | 8/2002 | Harris et al. ................ 713/502 |
| 6,463,096 | B1 | * | 10/2002 | Raleigh et al. .............. 375/225 |
| 6,505,250 | B2 | * | 1/2003 | Freund et al. ............... 709/226 |
| 6,687,735 | B1 | * | 2/2004 | Logston et al. ............. 709/203 |
| 7,069,337 | B2 | * | 6/2006 | Rawlins et al. ............. 709/238 |
| 7,333,495 | B2 | * | 2/2008 | Sala et al. .............. 370/395.21 |
| 7,382,755 | B2 | * | 6/2008 | Dugad et al. ................ 370/337 |
| 7,464,380 | B1 | * | 12/2008 | Hempel ...................... 718/102 |
| 2003/0065809 | A1 | * | 4/2003 | Byron ........................ 709/232 |

* cited by examiner

*Primary Examiner*—Alpus H Hsu
(74) *Attorney, Agent, or Firm*—Lee & Hayes, PLLC

(57) ABSTRACT

Shared network path contention can be reduced by limiting the number of contending client devices to which pending requests may be outstanding. Contention may also be reduced by managing available downstream bandwidth based on request size and managing available upstream bandwidth based on estimated response size. Portions of available downstream and/or upstream bandwidth may also be allocated to groups of one or more applications from which requests may be received, and the allocated portions may be configured to vary over time.

12 Claims, 16 Drawing Sheets

SHARED NETWORK PATH CONTENTION REDUCTION

TECHNICAL FIELD

This invention relates to bandwidth management and, in particular, to managing bandwidth to reduce contention in a shared network path.

BACKGROUND

With technological advances of recent years, television viewing is becoming more of an interactive experience. For example, rather than just broadcasting a television signal to be received by an antenna, cable television systems have been developed to broadcast television signals as well as other information, such as an up to date electronic program guide (EPG), to television set-top boxes that receive and process the data. High-end set-top boxes may be configured to support other applications as well, such as an Internet browser application. Other interactive applications may also be enabled over a cable television network, such as a user viewing log collection application, an instant messaging application, an email application, and so on.

Cable television systems (herein referred to as a headend) typically broadcast television programs over what is referred to as an in-band network, and broadcast EPG data and other such data over what is referred to as an out-of-band network. An in-band network may typically include hundreds of channels, each having a large bandwidth (e.g., capable of carrying 38 Mbps). The in-band network is used for one-way communication of data from the headend to the set-top boxes.

On the other hand, the out-of-band network typically consists of only one channel, and supports two-way communication, but with very limited bandwidth that must be shared by multiple set-top boxes on a particular network. Furthermore, the bandwidth available for transmitting data to the set-top boxes may be greater than the bandwidth available for receiving data from the set-top boxes. For example, a typical out-of-band channel may support the transfer of 2 Mbps of data from the headend to the set-top boxes (i.e., downstream) and 256 Kbps of data from the set-top boxes to the headend (i.e., upstream).

Furthermore, most cable television systems are configured to use a data transfer protocol in which it is common for data packets to collide and be lost, with no notification to the sender that the data was lost.

With an increased desire for interactive data applications to be available to cable television viewers over the cable television broadcast system, a need exists for reliable two-way data communication between a headend and multiple set-top boxes over the out-of-band network.

SUMMARY

Methods and systems for reducing network contention in a shared network path environment are described. In the described exemplary environment, upstream network path bandwidth is significantly smaller than corresponding downstream network path bandwidth. Also, multiple upstream network paths may correspond to a single downstream network path, and multiple client devices may share the same upstream path.

In one implementation, data collisions along an upstream network path are reduced by limiting the number of client devices that share a particular upstream network path to which pending requests may be outstanding. In an alternate implementation, a request is not sent to a client device until it is verified that a sufficient amount of downstream bandwidth is available based on the request size, and it is verified that a sufficient amount of upstream bandwidth is available based on an anticipated size of a response to the request. An exemplary system may also be configured to further limit the amount of upstream and/or downstream bandwidth that is available to requests received from one or more particular applications.

BRIEF DESCRIPTION OF THE DRAWINGS

The same numbers are used throughout the drawings to reference like features and components.

DETAILED DESCRIPTION

The following discussion is directed to methods and systems for enabling reliable two-way communication over an out-of-band network in a cable television system. Although described in the context of a cable television system, the methods and systems described herein may be implemented to enable reliable two-way communication over any network in which the downstream bandwidth differs from the upstream bandwidth.

Exemplary Environment

Figure 1:
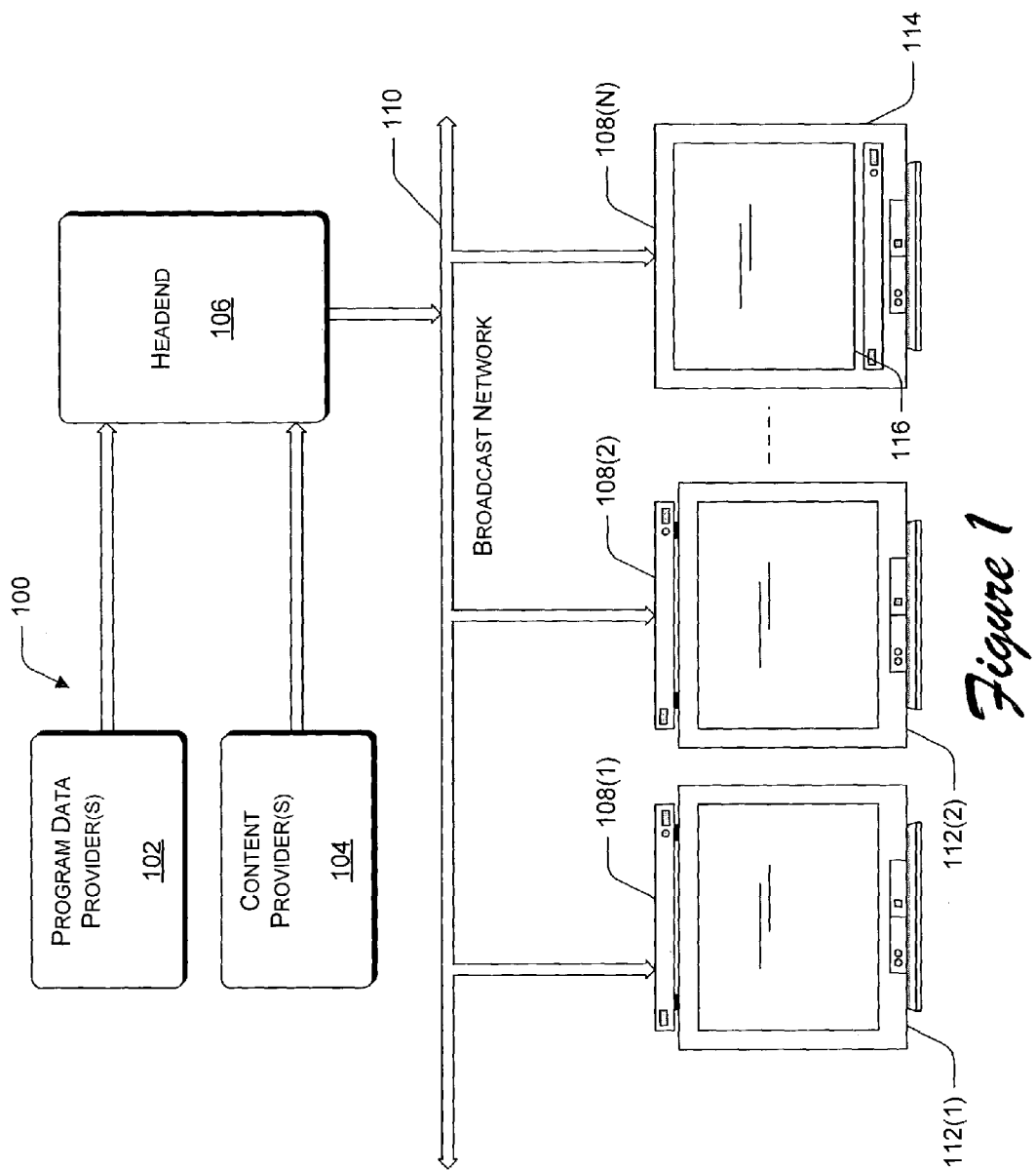
FIG. 1 is a block diagram illustrating an exemplary cable television network system.

FIG. 1 illustrates an exemplary environment 100 in which reliable two-way communication over a shared network may be implemented. Exemplary environment 100 is illustrated as a cable television system that facilitates distribution of content and program data to multiple viewers. The environment 100 includes one or more program data providers 102, one or more content providers 104, a headend 106, and multiple client devices 108(1), 108(2), . . . , 108(N) coupled to the headend 106 via a broadcast network 110.

Content providers 104 provide media content such as movies, television programs, commercials, music, and similar audio and/or video content to headend 106. Program data providers 102 provide additional data to headend 106, such as electronic program guide (EPG) data, advertisements, user interface data, and so on. EPG data that may be provided typically includes some combination of program identifiers, program titles, ratings, characters, descriptions, actor names, station identifiers, channel identifiers, schedule information, and so on.

Headend 106 processes the program data received from program data provider 102 and the content received from content provider 104 prior to transmitting the program data and content across broadcast network 110. Headend 106 broadcasts signals, such as cable television signals, across broadcast network 110.

Broadcast network 110 is representative of both an in-band network with substantial bandwidth, which is used to broadcast media content, and an out-of-band network with very limited bandwidth, which is used to broadcast EPG data. In the described exemplary implementation, the out-of-band network may also be used to facilitate two-way communication between an application stored at the headend 106 and one or more of the client devices 108.

Client devices 108 can be implemented in any number of ways. For example, client devices 108(1) and 108(2) are examples of television set-top boxes coupled to receive broadcast content from broadcast network 110 and provide the received content to associated televisions 112(1) and 112 (2), respectively. Client device 108(N) is an example of a combination television 114 and integrated set-top box 116. In this example, the various components and functionality of the set-top box are incorporated into the television, rather than using two separate devices. The set-top box incorporated into the television receives broadcast signals via broadcast network 110.

Exemplary Cable System Headend

Figure 2:
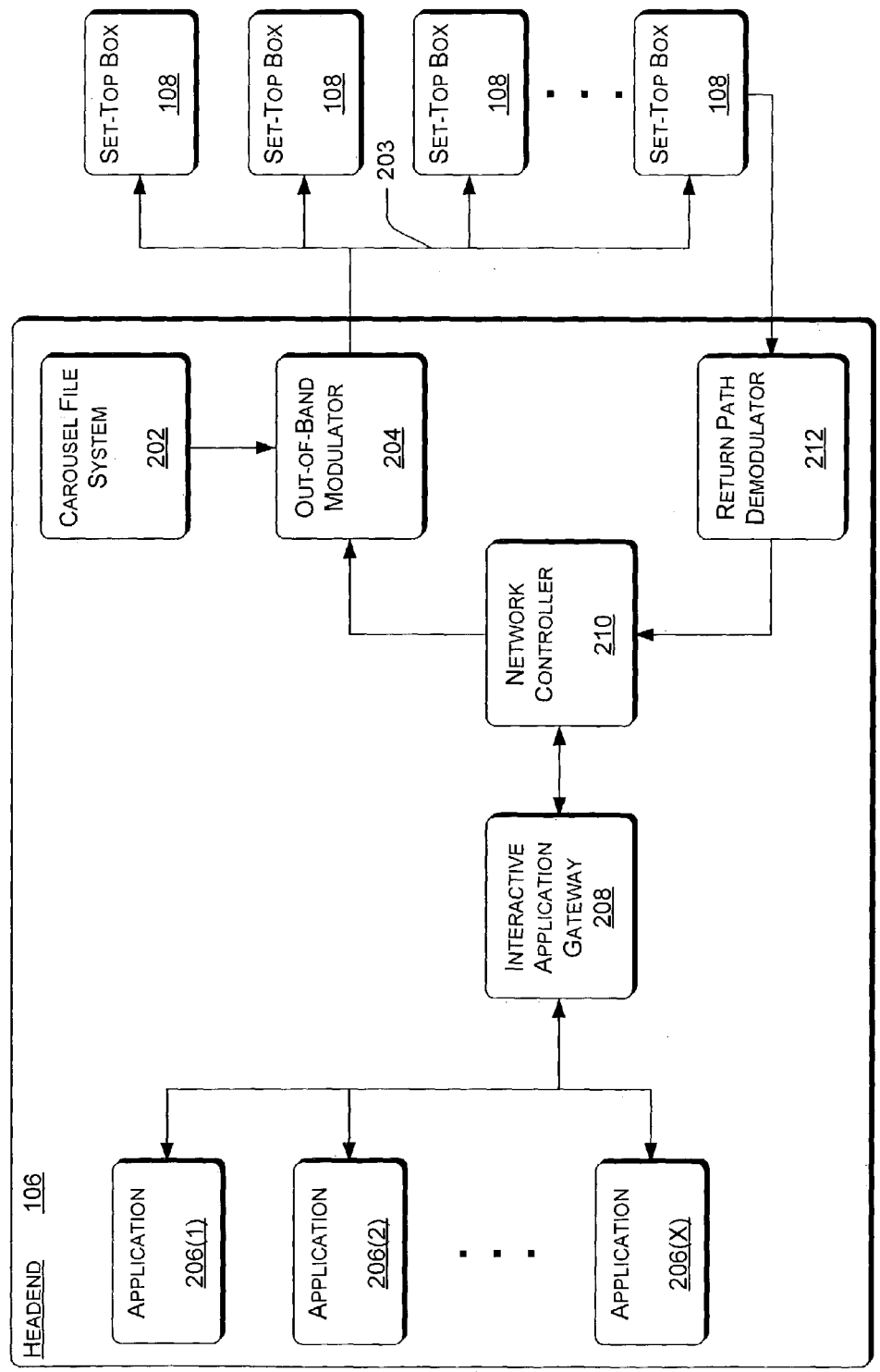
FIG. 2 is a block diagram illustrating selected components of, and a data flow path through, an exemplary cable television system headend.

FIG. 2 illustrates selected components of an exemplary cable system headend 106. Headend 106 includes a carousel file system 202, an out-of-band modulator 204, one or more applications 206(1), 206(2), . . . , 206(X), an interactive application gateway (IAG) 208, a network controller 210, and a return path demodulator 212. Carousel file system 202 is typically used to store data (e.g., EPG data) that can be broadcast over the out-of band network 203 to the multiple set-top boxes 108. Out of band modulator 204 generates formatted data packets from data that is received from the carousel file system 202, the network controller 210, and/or other devices, and outputs the formatted data packets at a constant bit rate over the out-of-band network 203. Network controller 210 and IAG 208 work together to control two-way communication over the out-of-band network 203 between one or more applications 206 and one or more set-top boxes 108. Return path demodulator 212 receives data transmitted from set-top boxes 108 over out-of-band network 203. Applications 206 may include any type of interactive applications that require two-way communication. Although not shown, applications 206 may reside on one or more different application servers associated with headend 106.

Exemplary Communication Paths

Figure 3:
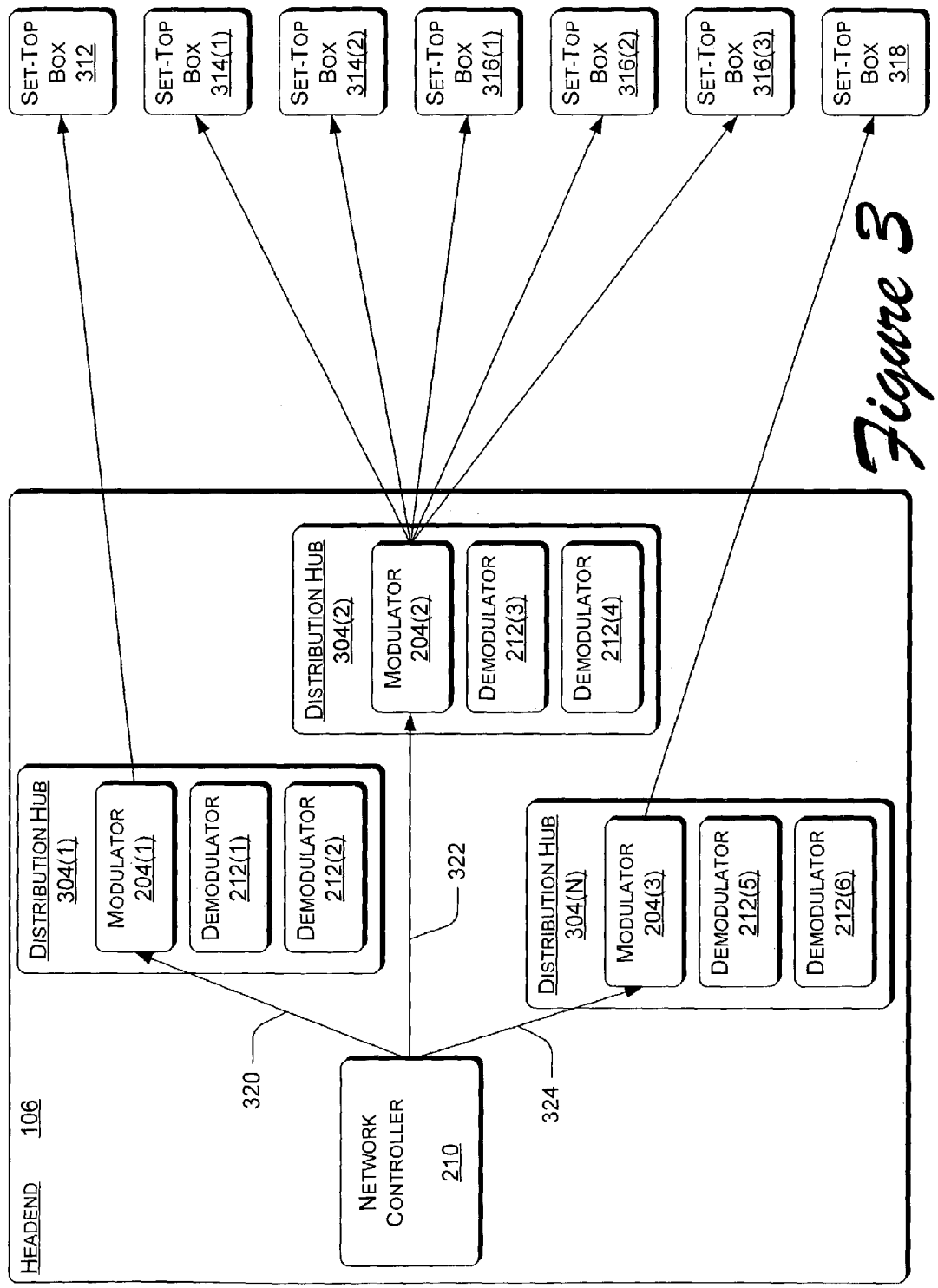
FIG. 3 is a block diagram illustrating exemplary downstream paths of an out-of-band network in the cable television system of FIG. 1.
Figure 4:
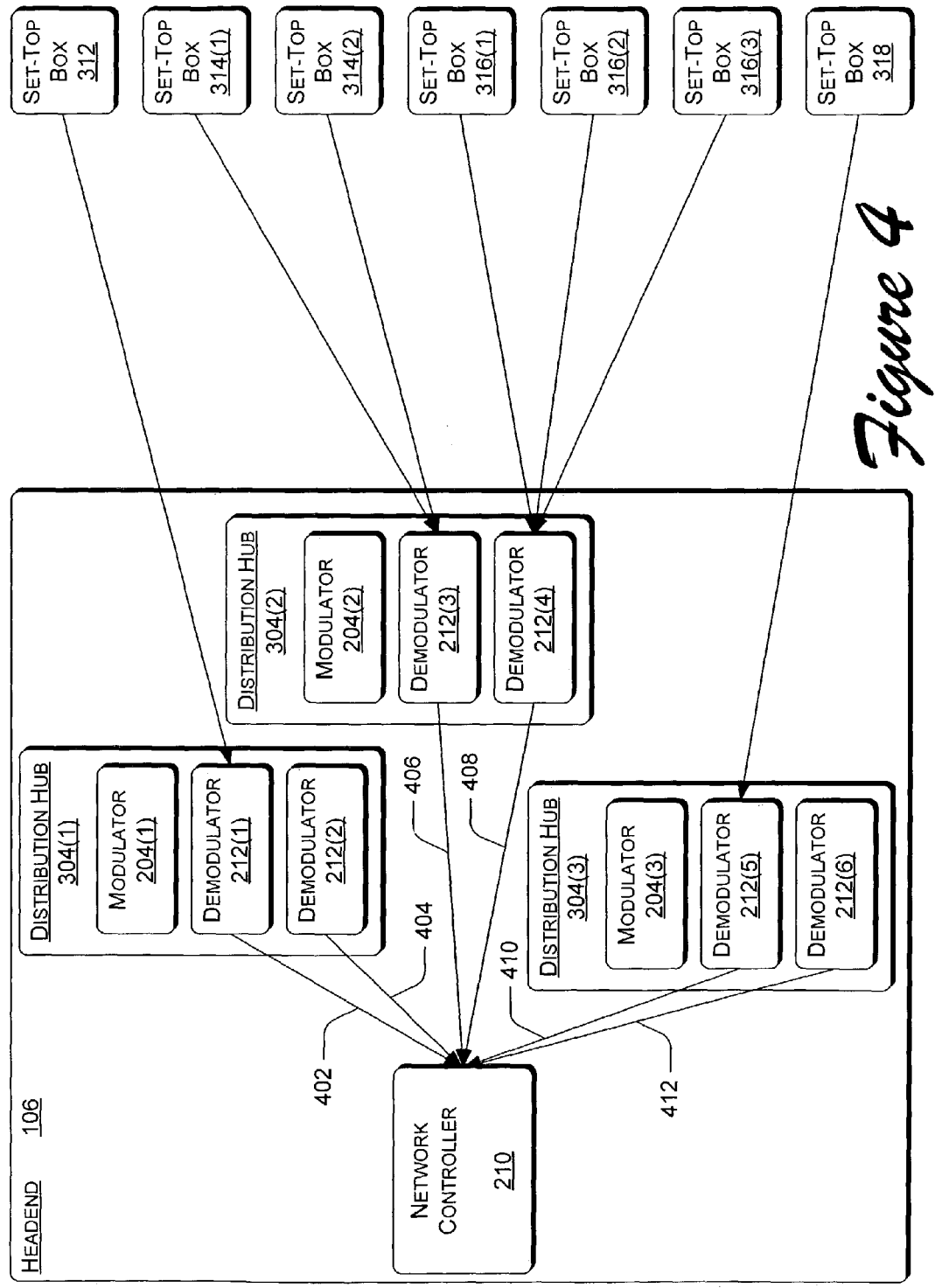
FIG. 4 is a block diagram illustrating exemplary upstream paths of an out-of-band network in the cable television system of FIG. 1.

FIGS. 3 and 4 illustrate exemplary downstream and upstream paths over an out-of-band network between a cable system headend 106 and multiple set-top boxes (e.g., client devices 108 as illustrated in FIGS. 1 and 2). In the described implementation, the broadcast network 110 includes a plurality of distribution hubs, each having one or more modulators and one or more demodulators.

FIG. 3 illustrates downstream paths of out-of-band network 203. Each downstream path of the out-of-band network is defined as a path from the network controller 210 to a modulator 204 in a distribution hub 304. In the example illustrated in FIG. 3, data (e.g., EPG data or data associated with an interactive application) is transferred from the headend 106 to set-top box 312 (and any other set-top boxes associated with modulator 204(1)) over a first downstream path 320. Similarly, data is transferred from the headend 106 to set-top boxes associated with modulator 204(2) through distribution hub 304(2) (i.e., set-top boxes 314(1), 314(2), 316(1), 316(2), 316(3)) over a second downstream path 322. Data is transferred from the headend 106 to set-top box 318 (and any other set-top boxes associated with modulator 204 (3) through distribution hub 304(N) over a third downstream path 324.

FIG. 4 illustrates upstream paths of out-of-band network 203. Each upstream path is defined as path that originates at a demodulator 212. In the example illustrated in FIG. 4, data (e.g., a response to a request associated with an interactive application) is transmitted from set-top box 312 to the headend 106 over a first upstream path 402 through demodulator 212(1) of distribution hub 304(1). Similarly, data can be transferred from either set-top box 314(1) or 314(2) to the headend 106 over upstream path 406 through demodulator 212(3). Set-top boxes 316(1), 316(2), and 316(3) communicate with headend 106 over upstream path 408 through demodulator 212(4), and set-top box 318 communicates with headend 106 over upstream path 410 through demodulator 212(5). Upstream paths 404 and 412 enable data transmission from set top boxes (not shown) associated with demodulators 212(2) and 212(6), respectively.

Therefore, according to the downstream and upstream paths shown in FIGS. 3 and 4, it is clear that set-top boxes that receive data from the headend over the same downstream path may transmit data to the headend over different upstream paths. For example, as shown in FIGS. 3 and 4, set-top boxes 314(1), 314(2), 316(1), 316(2), and 316(3) all receive data over the same downstream path 322, but set-top boxes 314(1) and 314(2) transmit data back over the upstream path 406, while set-top boxes 316(1), 316(2), and 316(3) transmit data back over the upstream path 408.

Two set-top boxes contend for a particular upstream path if there is a chance that a data packet sent by one of the set-top boxes can be lost due to a collision with a data packet sent by the other set-top box. In the described implementation, there is typically no contention for downstream paths because of an Ethernet link between network controller 210 and each modulator 204. The Ethernet link has carrier sense with collision detection to prevent data collisions. Data may be lost over the downstream path, however, if a modulator 204 is sent data at a faster rate than it can handle. Configuration of a downstream bandwidth limitation associated with a particular modulator 204 is used to prevent such an occurrence. Contention does exist, however, for the upstream paths because there is nothing in place to prevent two set-top boxes sharing the same upstream path from transmitting data at the same time. Interactive application gateway 208 is implemented at headend 106 to reduce upstream path contention by managing the transmission of requests from applications 206 to the set-top boxes.

Exemplary Interactive Application Gateway

Figure 5:
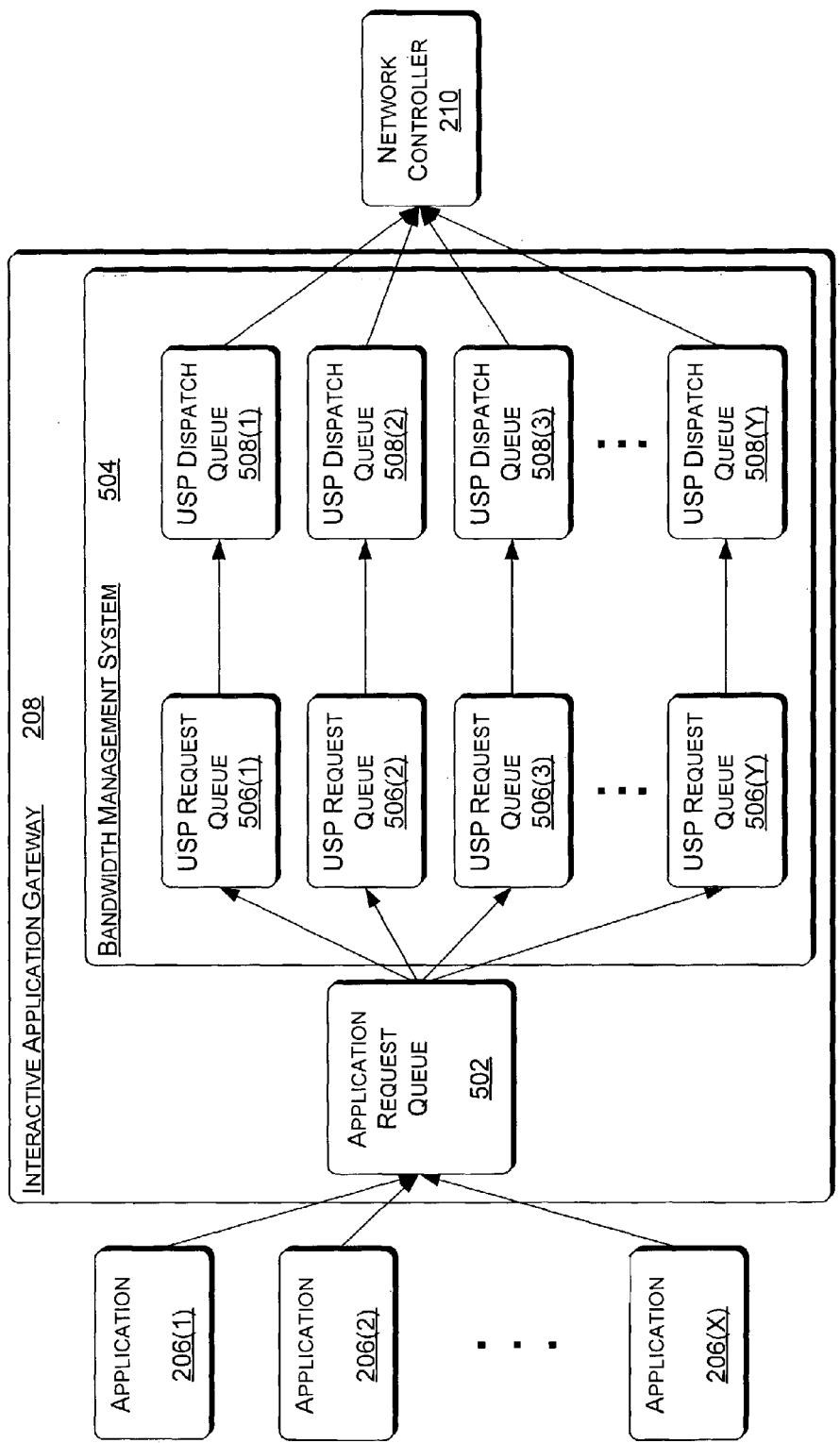
FIG. 5 is a block diagram illustrating data flow through an exemplary interactive application gateway component of the headend illustrated in FIG. 2.

FIG. 5 illustrates selected components of an exemplary interactive application gateway 208 within headend 106. Interactive application gateway 208 includes application request queue 502 and bandwidth management system 504. Application request queue 502 receives, from one or more applications 206, requests that are to be transmitted to one or more set-top boxes 108 over the out-of-band network 203. Bandwidth management system 504 includes upstream path (USP) request queues 506(1), 506(2), 506(3), . . . , and 506(Y). Bandwidth management system 504 further includes corresponding upstream path (USP) dispatch queues 508(1), 508(2), 508(3), . . . , and 508(Y). Each USP request queue 506 (and each corresponding USP dispatch queue 508) corresponds to an upstream path of the out-of-band network. Requests from applications 206 are transferred from application request queue 502 to bandwidth management system 504 where the requests are distributed to the appropriate USP request queues 506 based on which set-top box each request is directed to. For example, if USP request queue 506(1) corresponds to upstream path 406 (shown in FIG. 4), then any requests directed to set-top boxes 314(1) or 314(2) are placed in USP request queue 506(1). Similarly, if USP request queue 506(2) corresponds to upstream path 408, then any requests directed to set-top boxes 316(1), 316(2), or 316(3) are placed in USP request queue 506(2).

Bandwidth management system 504 applies a scheduling algorithm at regular intervals to transfer requests from USP request queues 506 to the corresponding USP dispatch queues 508. The requests are then transferred from the USP dispatch queues 508 to network controller 210, and then on to out-of band modulator 204 for transmission across out-of-band network 203 to the specified set-top boxes.

Exemplary Scheduling Algorithm

As described above, the downstream bandwidth leading to a particular set-top box may differ from the upstream bandwidth leading from the particular set-top box. Furthermore, multiple upstream paths may be associated with a single downstream path. For example, as illustrated in FIGS. 3 and 4 and described above, upstream paths 406 and 408 are used to transfer data from set-top boxes 214(1), 214(2), 216(1), 216(2), and 216(3), while the same set-top boxes all receive data over downstream path 322.

In the described implementation, requests are scheduled at regular intervals, the length of which, are configurable. The scheduling may be performed by default, for example, every second. In the described exemplary implementation, scheduling transmission of requests to, multiple set-top boxes is based on several factors including, the bandwidth of the downstream paths associated with the requests, the bandwidth of the upstream paths that will be associated with responses to the requests, the size of each request, the expected size of each requested response, and a time interval during which the requests are to be scheduled for transmission. Interactive application gateway 208 maintains the following set of configurable parameters that are used in scheduling the transmission of application requests:

upstream bandwidth, expressed in Kbps (bits per millisecond), for each upstream path (denoted by $ubw_{pathID}$)

downstream bandwidth, expressed in Kbps (bits per millisecond), for each downstream path (denoted by $dbw_{pathID}$)

time interval for scheduling, expressed in milliseconds (denoted by period)

average request data size, expressed in bits (denoted by RequestSize)

average response data size, expressed in bits (denoted by ResponseSize)

At the beginning of a scheduling interval, the total number of bits available on a particular upstream path during the scheduling interval is given by:

$$USPBits_{pathID} = ubw_{pathID} * \text{period bits.}$$

Similarly, the total number of bits available on a particular downstream path during the same scheduling interval is given by:

$$DSPBits_{pathID} = dbw_{pathID} * \text{period bits.}$$

A thread associated with the bandwidth management system 504 wakes up every period milliseconds, and transfers requests from the USP request queues 506 to the USP dispatch queues 508. For a given USP request queue, the next request in the queue can be scheduled (i.e., moved to the corresponding USP dispatch queue) if the upstream path associated with the USP dispatch queue has enough bandwidth available to support the average response size. As each request is scheduled, the number of bits available during the scheduling interval on the upstream and downstream paths are adjusted according to the following equations:

$$\text{Remaining } USPBits_{pathID} = USPBits_{pathID} - ResponseSize$$

$$\text{Remaining } DSPBits_{pathID} = DSPBits_{pathID} - RequestSize$$

When a request is added to a particular USP dispatch queue 508, a dispatcher thread associated with that particular upstream path picks up the request and initiates communication with the set-top box. When communication is initiated, the dispatcher thread sends the request data to the set-top box through the network controller 210 and out-of-band modulator 204.

In an exemplary implementation, the time it takes to receive a response to a request is gathered as requests are received. This data is then used to calculate running averages of the amount of data exchanged (i.e., RequestSize and ResponseSize) and the current speed of processing requests. In the described exemplary implementation, data is gathered and calculated independently for each application so that, for example, each application has an associated average request size and average response size. In this way, the IAG 208 can dynamically adjust the load it puts on the network. For example, if there is a sudden spike in network activity caused by an external application, the available bandwidth may be reduced, and the time it takes to process a request may go up. Based on that information, the IAG 208 reduces the number of requests that are dispatched during a particular scheduling interval. As more bandwidth becomes available, the number of requests dispatched can go back up.

Figure 6:
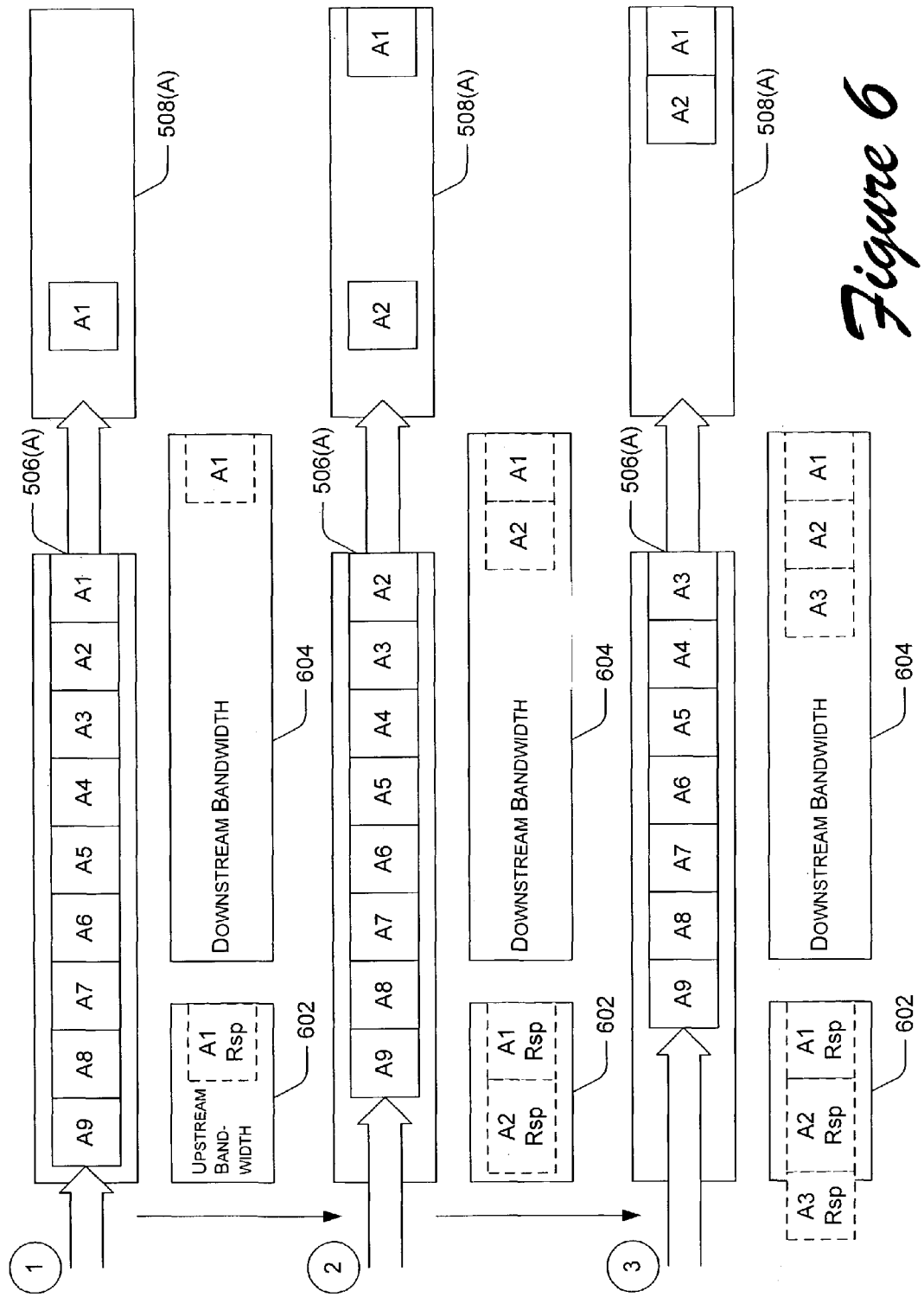
FIG. 6 is a block diagram illustrating the transfer of requests from a first upstream path request queue to a corresponding upstream path dispatch queue.
Figure 7:
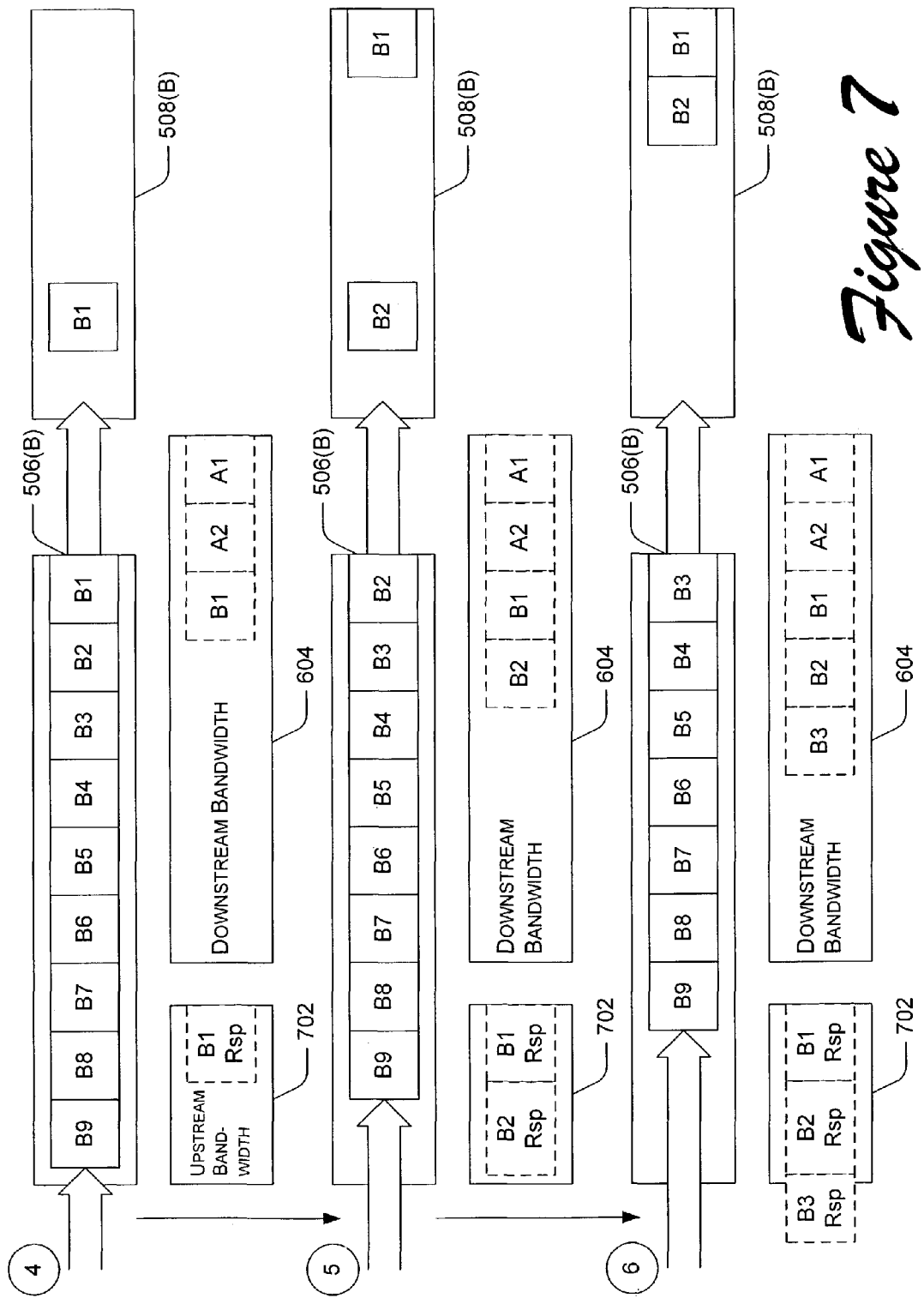
FIG. 7 is a block diagram illustrating the transfer of requests from a second upstream path request queue to a corresponding upstream path dispatch queue.
Figure 8:
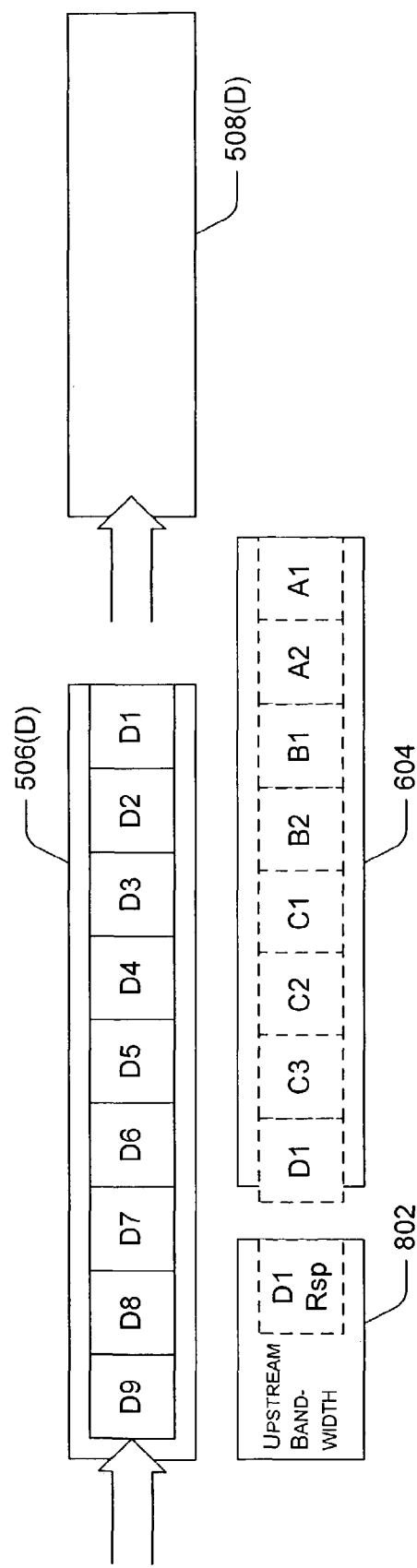
FIG. 8 is a block diagram illustrating processing performed to determine whether sufficient bandwidth is available to transfer a request from an upstream path request queue to a corresponding upstream path dispatch queue.

FIGS. 6-8 illustrate processing that may occur to schedule for dispatch, requests that are to be sent to four set-top boxes that share a downstream path, but that are distributed across four different upstream paths. FIG. 6 illustrates transferring of requests from a first USP request queue 506(A) to a corresponding USP dispatch queue 508(A). FIG. 6 is divided into three horizontal sections, as indicated by the circled numbers, 1-3. At the beginning of the scheduling interval, USP request queue 506(A) contains nine requests (i.e., A1, A2, A3, A4, A5, A6, A7, A8, and A9). The available upstream bandwidth is represented by box 602 while the available downstream bandwidth is represented by box 604. Bandwidth management system 504 determines whether or not the first queued request A1 can be handled by the available downstream bandwidth 604. (This is represented in FIG. 6 by the dashed box A1 within the downstream bandwidth box 604.) Bandwidth management system 504 also determines whether or not an expected size of a response to request A1 can be handled by the available upstream bandwidth 602. (This is represented in FIG. 6 by the dashed box A1 Rsp within the upstream bandwidth box 602.) If the request can be handled by the downstream bandwidth and the anticipated response to the request can be handled by the upstream bandwidth, then the request is transferred from the USP request queue 506(A) to the corresponding USP dispatch queue 508(A).

If the first queued request A1 is successfully transferred to the dispatch queue 508(A), then a similar process is performed with respect to the next queued request A2. This is illustrated in the second horizontal section of FIG. 6, denoted by the circled 2. In the illustrated example, the available downstream bandwidth 604 can accommodate request A2 and the available upstream bandwidth 602 can accommodate the anticipated response to request A2. Accordingly, request A2 is moved from USP request queue 506(A) to the corresponding USP dispatch queue 508(A). Although request A1 is illustrated as still being in dispatch queue 508(A), it is likely that request A1 may be dispatched before request A2 is added to the dispatch queue.

The third horizontal section of FIG. 6, denoted by the circled 3, illustrates a similar process performed with respect to the next queued request A3. In the illustrated example, the available downstream bandwidth 604 can accommodate the request A3, but the available upstream bandwidth 602 cannot accommodate the anticipated response to request A3. Accordingly, queued request A3 is not transferred to USP dispatch queue 508(A), but remains in USP request queue 506(A). Because the available upstream bandwidth cannot accommodate the anticipated response to the next queued request, bandwidth management system 504 begins scheduling requests associated with the next upstream path.

FIG. 7 illustrates transferring of requests from a second USP request queue 506(B) to a corresponding USP dispatch queue 508(B). FIG. 7 is divided into three horizontal sections, as indicated by the circled numbers, 4-6. When processing of USP request queue 506(B) begins, USP request queue 506(B) contains nine requests (i.e., B1, B2, B3, B4, B5, B6, B7, B8, and B9). The available upstream bandwidth is represented by box 702 while the available downstream bandwidth is represented by box 604. Bandwidth management system 504 determines whether or not the first queued request B1 can be handled by the available downstream bandwidth 604. (This is represented in FIG. 7 by the dashed box B1 within the downstream bandwidth box 604.) Because upstream paths A and B are associated with the same downstream path, the downstream bandwidth must be able to accommodate any previously scheduled requests (A1 and A2) as well as any requests to be scheduled. Bandwidth management system 504 also determines whether or not an expected size of a response to request B1 can be handled by the available upstream bandwidth 702. (This is represented in FIG. 7 by the dashed box B1 Rsp within the upstream bandwidth box 702.) If the request can be handled by the downstream bandwidth and the anticipated response to the request can be handled by the upstream bandwidth, then the request is transferred from the USP request queue 506(B) to the corresponding USP dispatch queue 508(B).

In the illustrated example, similar to the scheduling of requests from USP request queue 506(A), the available upstream bandwidth can accommodate two of the queued requests, but not the third. Therefore, requests B1 and B2 are transferred to the USP dispatch queue 506(B). Bandwidth management system 504 continues processing in this manner, one USP request queue at a time, scheduling as many requests as possible. Also, although, as illustrated, dispatch queue 508(B) contains requests B1 and B2 at the same time, request B1 may be dispatched before request B2 is added to dispatch queue 508(B).

FIG. 8 illustrates processing to schedule requests from USP request queue 506(D). In the illustrated example, it is assumed that two requests (A1 and A2) have been scheduled from USP request queue 506(A), two requests (B1 and B2) have been scheduled from USP request queue 506(B), and three requests (C1, C2, and C3) have been scheduled from another USP request queue (not shown).

When processing of USP request queue 506(D) begins, USP request queue 506(D) contains nine requests (i.e., D1, D2, D3, D4, D5, D6, D7, D8, and D9). The available upstream bandwidth is represented by box 802 while the available downstream bandwidth is represented by box 604. Bandwidth management system 504 determines whether or not an expected size of a response to request D1 can be handled by the available upstream bandwidth 802. (This is represented in FIG. 8 by the dashed box D1 Rsp within the upstream bandwidth box 802.) Bandwidth management system 504 also determines whether or not the first queued request D1 can be handled by the available downstream bandwidth 604. (This is represented in FIG. 8 by the dashed box D1 within the downstream bandwidth box 604.) Because upstream paths A, B, C, and D are associated with the same downstream path, the downstream bandwidth must be able to accommodate any previously scheduled requests (A1, A2, B1, B2, C1, C2, and C3) as well as any requests to be scheduled. In the illustrated example, the available downstream bandwidth 604 cannot accommodate queued request D1, even though the available upstream bandwidth 802 can accommodate the anticipated response to queued request D1. Accordingly, request D1 is not transferred from USP request queue 506(D) to USP dispatch queue 508(D). Furthermore, because the available downstream bandwidth is essentially full, bandwidth management system 504 does not attempt to schedule any additional requests for the particular downstream path during the current scheduling interval. Scheduling does continue, however, for USP request queues associated with other downstream network paths. In an exemplary implementation, to ensure that requests in each USP request queue get scheduled, with each new scheduling interval, bandwidth management system 504 begins scheduling requests from the first USP request queue from which no requests were scheduled during the previous scheduling interval. Accordingly, in the example described, USP request queue 506(D) would be processed first in association with the particular downstream path during the next scheduling interval.

In the example described above with reference to FIGS. 6-8, each USP request queue 506 had only a single associated set-top box. However, in reality, a particular upstream network path may support multiple set-top boxes, and therefore each USP request queue 506 may contain requests directed to any combination of those multiple set-top boxes. In the above-described scenario, while data is being sent to the set-top box over the downstream path, the corresponding upstream path is idle. Similarly, when the set-top box sends a response to the request, the upstream path is busy, but the downstream path is then idle. Accordingly, in an exemplary implementation, to reduce network idle time, and thereby increase performance, communication with multiple set-top boxes that share the same upstream path may be allowed during a particular scheduling interval. However, the more set-top boxes that share the same upstream path that are trying to communicate with the headend at the same time, the higher the chance of data collisions and lost data packets. Therefore, IAG 208 may also maintain a configurable maxConnections parameter that identifies a maximum number of set-top boxes that share a single upstream path and can be scheduled to receive requests during a single request scheduling interval. The smaller the value of maxConnections, the lower the risk of losing data packets.

A dispatcher thread associated with a particular dispatch queue controls the dispatch of scheduled requests based on the maxConnections parameter. As an example, referring back to FIG. 6, if maxConnections=1, then requests A1 and A2 can be dispatched simultaneously if they are both directed to the same set-top box. On the other hand, if maxConnections>1, then requests A1 and A2 may be dispatched simultaneously even if they are directed to different set-top boxes that share the same upstream path.

Alternate Exemplary Scheduling Algorithm

Figure 9:
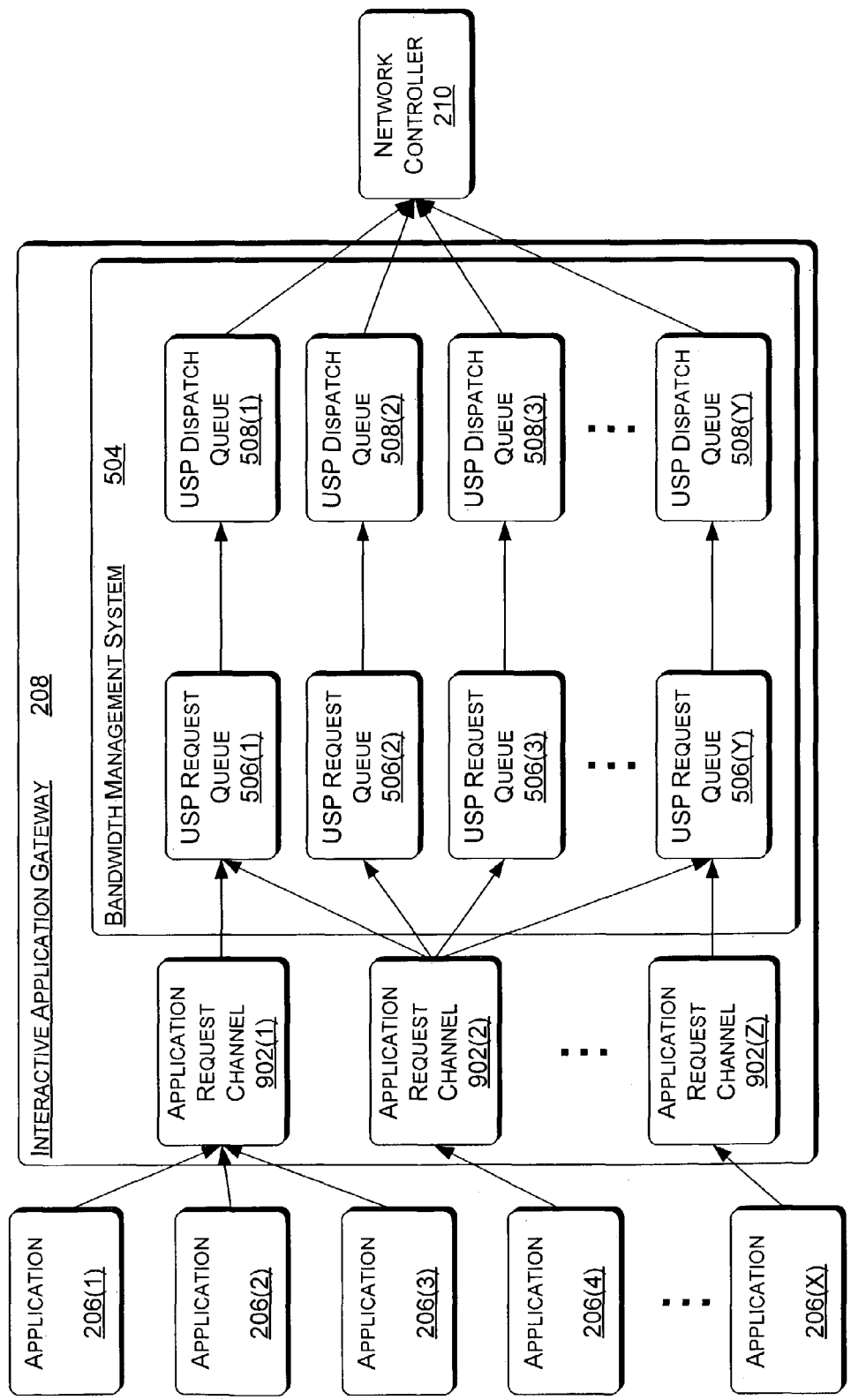
FIG. 9 is a block diagram illustrating data flow through an exemplary interactive application gateway that includes application request channels.

When multiple applications 206 are trying to communicate with set-top boxes over the same downstream and upstream paths, it is important to ensure that bandwidth is available to each of the applications. Furthermore, some applications may require more bandwidth than others, more specifically, one application may require a large amount of downstream bandwidth but only a small amount of upstream bandwidth, or visa versa. FIG. 9 illustrates selected components of an exemplary interactive application gateway 208 configured to manage bandwidth for multiple channels of a two-way communication network. Similar to FIG. 5, the IAG 208 shown in FIG. 9 includes bandwidth management system 504. Bandwidth management system 504 includes upstream path (USP) request queues 506(1), 506(2), 506(3), . . . , and 506(Y). Bandwidth management system 504 further includes corresponding upstream path (USP) dispatch queues 508(1), 508(2), 508(3), . . . , and 508(Y). As described above with respect to FIG. 5, each USP request queue 506 (and each corresponding USP dispatch queue 508) corresponds to an upstream path of the out-of-band network. Where the IAG 208 illustrated in FIG. 5 includes an application request queue 502, the IAG 208 illustrated in FIG. 9 includes application request channels 902(1), 902(2), . . . , 902(Z). Each application request channel may be configured to use up to a particular portion of the associated upstream and/or downstream network path. For example, application request channel 902(1) may be configured to use up to 25% of the downstream path and 75% of the upstream path, and application request channel 902(2) may be configured to use up to 60% of the downstream path but only 10% of the upstream path. One or more applications 206 may then be assigned to a particular application request channel 902, indicating that that requests from that particular application 206 may have access to the designated upstream and/or downstream bandwidth. Application request channels 902 receive, from one or more applications 206, requests that are to be transmitted to one or more set-top boxes 108 over the out-of-band network 203. Requests from applications 206 are transferred from application request channels 902 to bandwidth management system 504 where the requests are distributed to the appropriate USP request queues 506 based on which set-top box each request is directed to. For example, if USP request queue 506(1) corresponds to upstream path 406 (shown in FIG. 4), then any requests directed to set-top boxes 314(1) or 314(2) are placed in USP request queue 506(1). Similarly, if USP request queue 506(2) corresponds to upstream path 408, then any requests directed to set-top boxes 316(1), 316(2), or 316(3) are placed in USP request queue 506(2).

Bandwidth management system 504 applies a scheduling algorithm at regular intervals to transfer requests from USP request queues 506 to the corresponding USP dispatch queues 508. The requests are then transferred from the USP dispatch queues 508 to network controller 210, and then on to out-of band modulator 204 for transmission across out-of-band network 203 to the specified set-top boxes.

Figure 10:
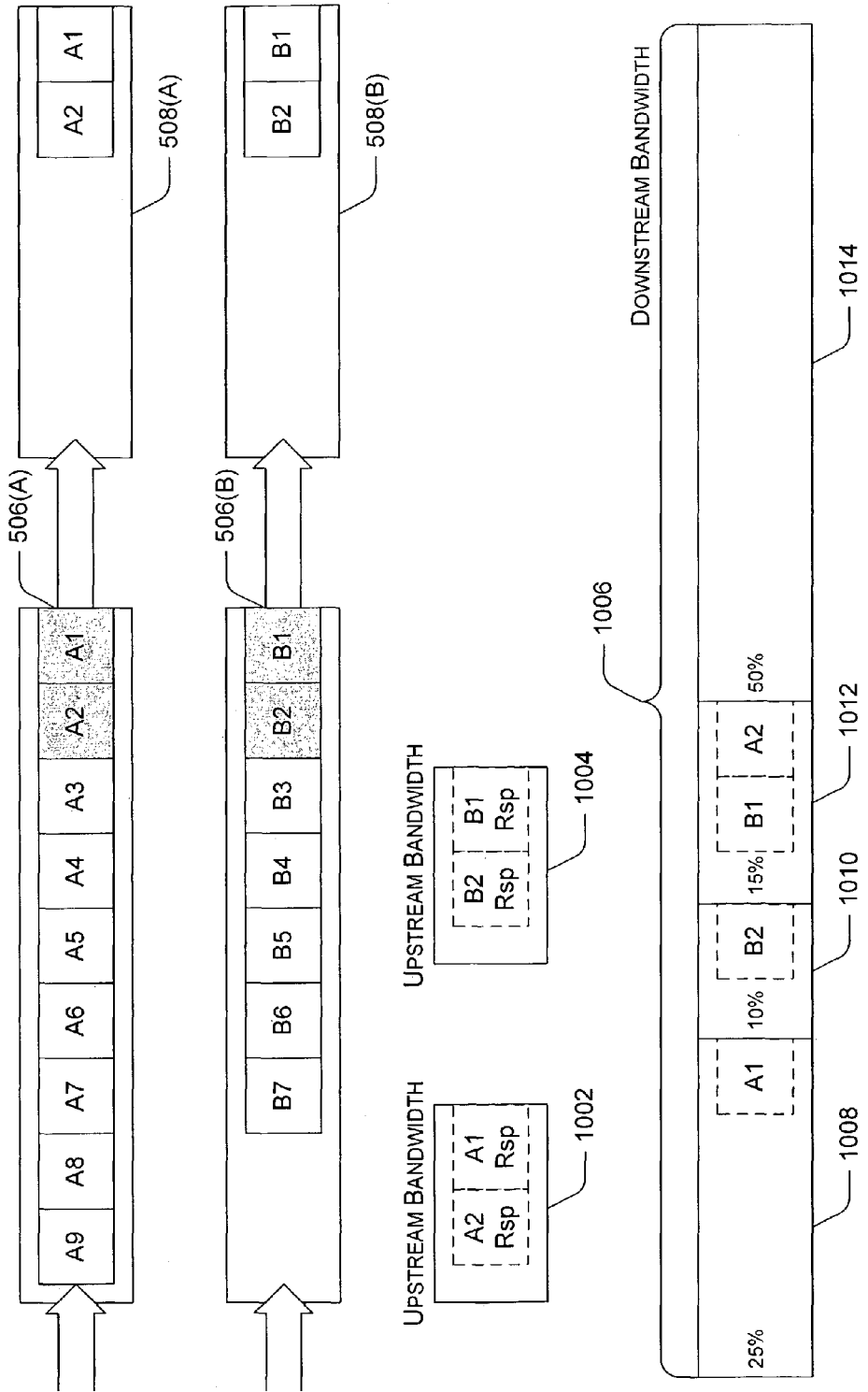
FIG. 10 is a block diagram illustrating processing performed to determine whether sufficient bandwidth is available to transfer requests from upstream path request queues to corresponding upstream path dispatch queues.

FIG. 10 illustrates transferring of requests from two USP request queues 506(A) and 506(B) to corresponding USP dispatch queues 508(A) and 508(B). At the beginning of the scheduling interval, USP request queue 506(A) contains nine requests (i.e., A1, A2, A3, A4, A5, A6, A7, A8, and A9) and USP request queue 506(B) contains seven requests (i.e., B1, B2, B3, B4, B5, B6, B7). In the illustrated example, request A1 was received from an application request channel 902 that is configured to access up to 25% of the available downstream bandwidth. Similarly, requests A2 and B1 were received from an application request channel 902 configured to access up to 15% of the available downstream bandwidth, and request B2 was received from an application request channel 902 configured to access up to 10% of the available downstream bandwidth. (In the illustrated example, the application request channels do not have specified upstream bandwidth limitations.) The available upstream bandwidth associated with USP dispatch queue 508(A) is represented by box 1002, the available upstream bandwidth associated with USP dispatch queue 508(B) is represented by box 1004, and the available downstream bandwidth associated with both USP dispatch queues is represented by box 1006. The downstream bandwidth 1006 is divided up into four channels 1008, 1010, 1012, and 1014, each of which may be associated with a particular application request channel 902. For example, downstream channel 1008, which includes 25% of the total available bandwidth may be assigned to a first application channel, downstream channel 1010, which includes 10% of the total available downstream bandwidth may be assigned to a second application channel 902, and downstream channel 1012, which includes 15% of the total available downstream bandwidth may be assigned to a third application request channel 902. Downstream channel 1014, which includes 50% of the total available downstream bandwidth may be assigned to a fourth application request channel, or may not be assigned to an application request channel, but may be accessible to applications that are not assigned to an application request channel.

When scheduling queued requests, bandwidth management system 504 determines whether or not an expected size of a response to request A1 can be handled by the available upstream bandwidth 1002. (This is represented in FIG. 10 by the dashed box A1 Rsp within the upstream bandwidth box 1002.) Bandwidth management system 504 also determines whether or not the first queued request A1 can be handled by the portion of the available downstream bandwidth assigned to the application request channel through which the request was received. For example, in the illustrated example, request A1 was received through an application request channel that is associated with 25% of the total available downstream bandwidth. Accordingly, bandwidth management system 504 determines whether or not request A1 can be accommodated with 25% of the total available downstream bandwidth. (This is represented in FIG. 10 by the dashed box A1 within downstream channel 1008.) Because the request can be handled by the downstream channel and the anticipated response to the request can be handled by the upstream bandwidth, the request is transferred from the USP request queue 506(A) to the corresponding USP dispatch queue 508(A).

To schedule request A2, bandwidth management system 504 verifies that an anticipated response to request A2 can be handled by the available upstream bandwidth 1002 and that the response can be handled by the downstream channel 1012 that is associated with application request channel through which request A2 was received. Requests B1 and B2 are scheduled in a similar way. To schedule request B1, bandwidth management system 504 verifies that an anticipated response to the request can be handled by the available upstream bandwidth 1004 and that the response can be handled by the downstream channel 1012 that is associated with the application request channel through which request B1 was received. Because requests A2 and B1 were received through the same application request channel, in order for both requests to be scheduled, both requests must fit within the downstream channel 1012 associated with the application request channel through which the requests were received.

In an exemplary implementation, less than 100% of the total available bandwidth (upstream and/or downstream) may be distributed across application requests channels 902. For example, in a system that supports video-on-demand (VOD), one or more of the set-top boxes may be allowed to initiate communication over the out-of-band network, for example, to request a particular video-on-demand. To reduce the chance of data collisions caused by too much data traffic and not enough bandwidth to support it, a portion of the total available upstream bandwidth may be reserved (not assigned to any of the application request channels) to ensure that at least a portion of the upstream bandwidth is available when a set-top box initiates a request.

Furthermore, in addition to assigning different portions of available upstream and/or downstream bandwidth to application request channels 902, the portions that are assigned may vary over time. For example, VOD requests may be minimal Monday Friday between the hours of 3:00 am and 8:00 pm, but the number of VOD requests may increase on the weekends and Monday-Friday between the hours of 8:00 pm and 3:00 am. Accordingly, bandwidth management system 504 may be configured to allocate, for example, 100% of the available upstream bandwidth across the application request channels Monday-Friday between 3:00 am and 8:00 pm, but to allocate, for example, only 75% of the available upstream bandwidth across the application request channels on the weekends and Monday-Friday between 8:00 pm and 3:00 am, thereby reserving 25% of the total available upstream bandwidth for use by set-top boxes initiating requests.

For example, if a bandwidth management system is set up to include four application request channels, each being assigned 25% of the available upstream bandwidth. If the total upstream bandwidth is 10000 bits in the current scheduling interval, and 100% of the total bandwidth is available to the application request channels, then each application request channel can use up to 2500 bits. If, however, at a certain time of day, 25% of the total upstream bandwidth is reserved to facilitate set-top box initiated requests, then each application request channel may only use up to 1875 bits (i.e., 25% of 75% of 10000).

Additionally, the portions of bandwidth assigned to particular application request channels may vary over time. For example, a particular application may require more bandwidth during a certain time of the day. Accordingly, the application request channel that the application is associated with may be assigned, for example, only 10% of the available upstream and/or downstream bandwidth most of the time, but during the time when the application demands more bandwidth, the application request channel may be assigned, for example, 50% of the available bandwidth.

Handling Failures

In the described exemplary implementation, assuming the maxConnections parameter equals one, requests are dispatched from a dispatch queue one at a time. The next request is not dispatched until a response to the previous request is received or until the previous request times out.

Figure 11:
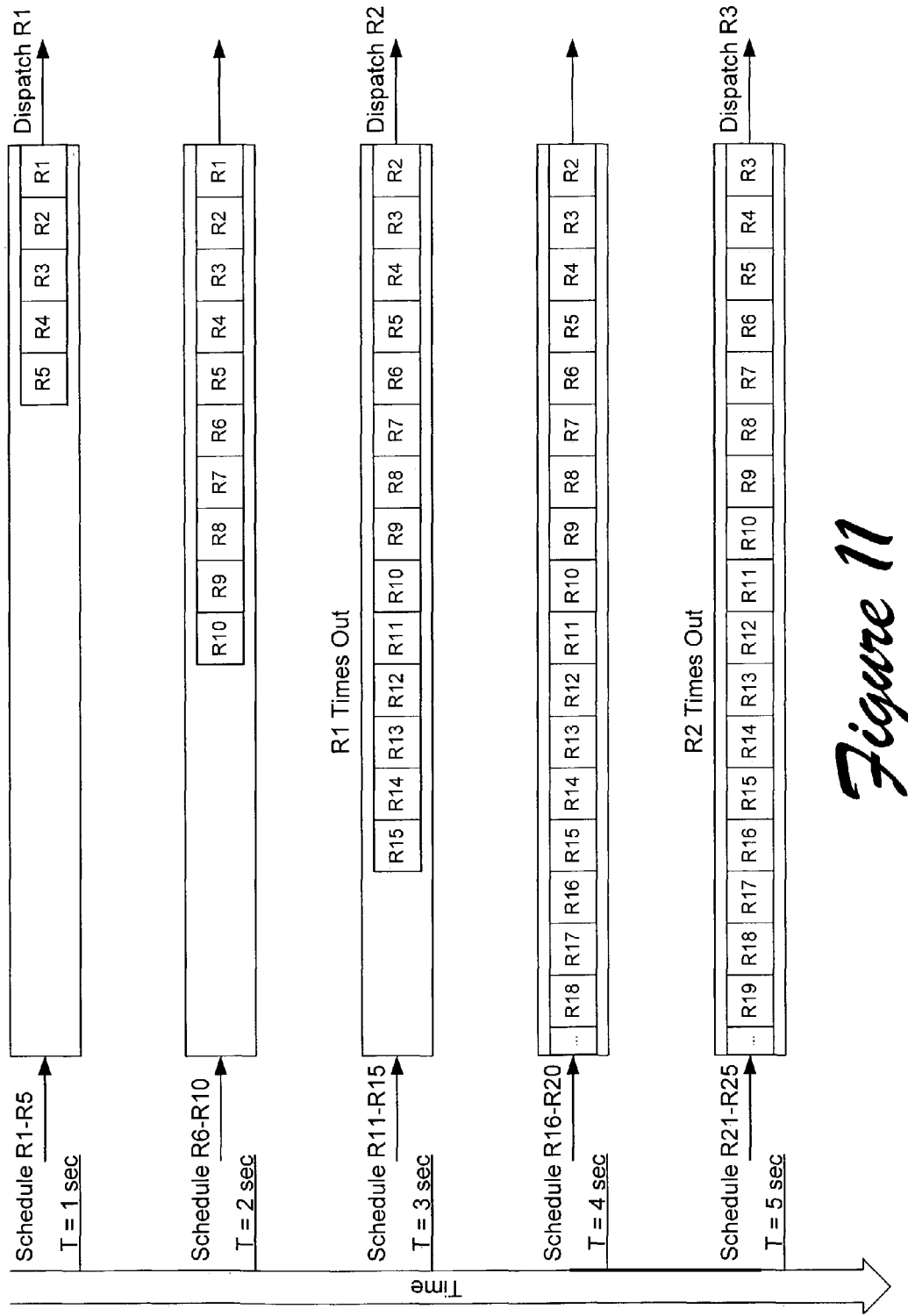
FIG. 11 is a block diagram illustrating negative effects of repeated request failures.

FIG. 11 illustrates negative effects of repeated request failures. Boxes 1102 represent a USP dispatch queue associated with a particular upstream network path. In the illustrated example, it is assumed that requests are scheduled for dispatch every second and that a timeout interval is set to two seconds. It is also assumed that five requests can be scheduled during any given scheduling interval. Accordingly, as illustrated in FIG. 11, at time t=1 second, five requests (i.e., R1, R2, R3, R4, and R5) are added to USP dispatch queue 1102. At the same time, the first of the scheduled requests (R1) is dispatched.

Assuming that the set-top box to which request R1 was dispatched is unresponsive, request R1 remains pending for two seconds (based on the timeout period). Because the scheduling interval is only one second, at time t=2 seconds, even though no more requests have been dispatched from the queue, five more requests (R6-R10) are added to the queue.

At time t=3 seconds, request R1 times out, so request R2 can be dispatched. In addition, five more requests (R11-R15) are scheduled.

As is apparent from FIG. 11, when one or more set-top boxes associated with a particular USP dispatch queue are unresponsive, the system can get overloaded with requests that can not be dispatched as fast as they are being scheduled.

Figure 12:
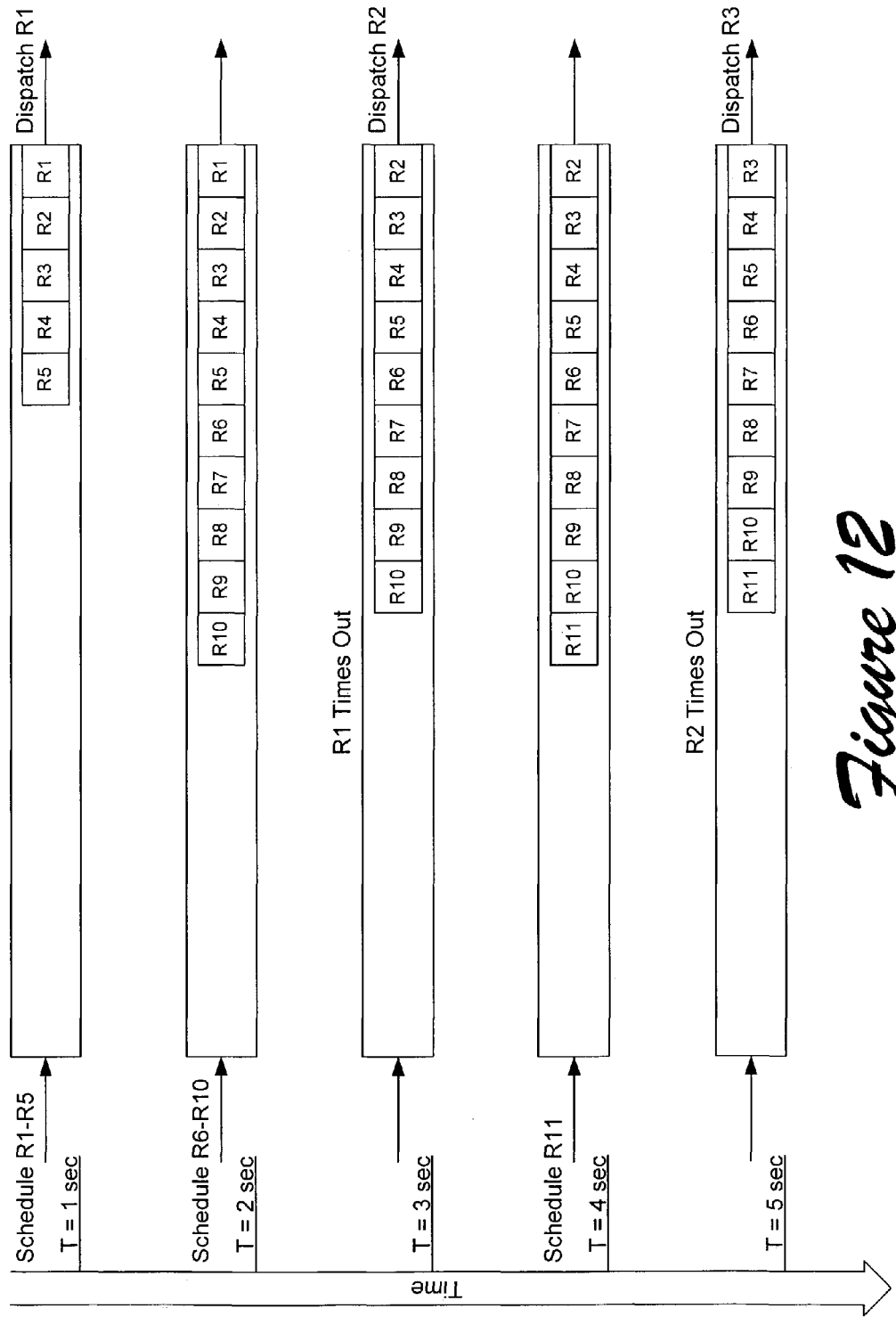
FIG. 12 is a block diagram illustrating an upstream path dispatch queue over time in a system configured to perform failure handling.

FIG. 12 illustrates an exemplary USP dispatch queue over time in a system that handles failures. Boxes 1202 represent a USP dispatch queue over time. As in FIG. 11, it is assumed that requests are scheduled for dispatch every second and that a timeout interval is set to two seconds. It is also assumed that five requests can be scheduled during any given scheduling interval. Accordingly, as illustrated in FIG. 12, at time t=1 second, five requests (i.e., R1, R2, R3, R4, and R5) are added to USP dispatch queue 1202. At the same time, the first of the scheduled requests (R1) is dispatched.

Assuming that the set-top box to which request R1 was dispatched is unresponsive, request R1 remains pending for two seconds (based on the timeout period). Because the scheduling interval is only one second, at time t=2 seconds, even though no more requests have been dispatched from the queue, five more requests (R6-R10) are added to the queue.

To prevent the number of pending requests in USP dispatch queue 1202 from getting too large, a maximum number of pending requests is enforced. In an exemplary implementation, the maximum number of pending requests is an integer multiple of the number of requests that can be scheduled during a particular scheduling interval. In the illustrated example, it is assumed that the limit is two times the number of requests that can be scheduled, or 10 pending requests. When the maximum number is reached, only one addition request is allowed to be scheduled during each successive timeout period. For example, in the illustrated example, the scheduling interval is every second, but the timeout period is two seconds. Accordingly, when the maximum number of pending requests is reached, from that point on, only one request can be scheduled every two seconds, which is the equivalent of every other scheduling interval.

This concept is illustrated in FIG. 12 where, at time t=3 seconds, request R1 times out, so request R2 can be dispatched.

At time t=4 seconds, request R2 is still pending, but one more request is scheduled, again bringing the queue to its maximum capacity.

In the described exemplary implementation, the rate at which requests are scheduled increases as set-top boxes become more responsive and more requests are able to be dispatched during a particular interval.

Methods for Reducing Network Contention

Figure 13:
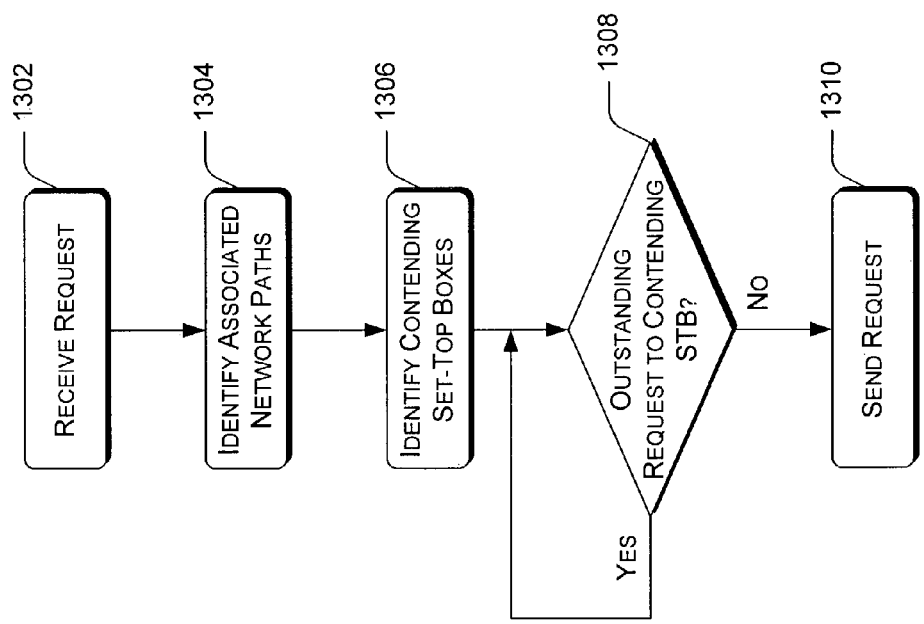
FIG. 13 is a flow diagram of an exemplary method for reducing network contention when scheduling transmission of requests.

FIG. 13 illustrates an exemplary method for scheduling transmission of requests, resulting in reduced network contention. The process shown in FIG. 13 is illustrated as a set of operations shown as discrete blocks. The process may be implemented in any suitable hardware, software, firmware, or combination thereof. The order in which the operations are described is not to be construed as a limitation.

At block 1302, IAG 208 receives a request from an application 206. For example, the received request is added to application request queue 502.

At block 1304, IAG 208 identifies the network paths associated with the request. A downstream network path is the path over which the request will be transmitted. An upstream network path is the path over which a response to the request may be received. For example, in an exemplary implementation, each request includes an upstream path ID, a downstream path ID, and an IP address associated with the set-top box to which the request is directed.

At block 1306, IAG 208 identifies other set-top boxes that share the same upstream path ID. The group of set-top boxes that share a particular upstream path are known as contending set-top boxes.

At block 1308, IAG 208 determines whether there are any pending requests that have been transmitted to any of the contending set-top boxes.

At block 1310, when it is determined that there are no pending requests to contending set-top boxes, IAG 208 sends the request, for example, by pushing the request to network controller 210, which then causes the request to be transmitted to the client device.

If, at block 1308, it is determined that there is a pending request to a contending set-top box, then processing continues at block 1308 until there is no longer a pending request.

Figure 14:
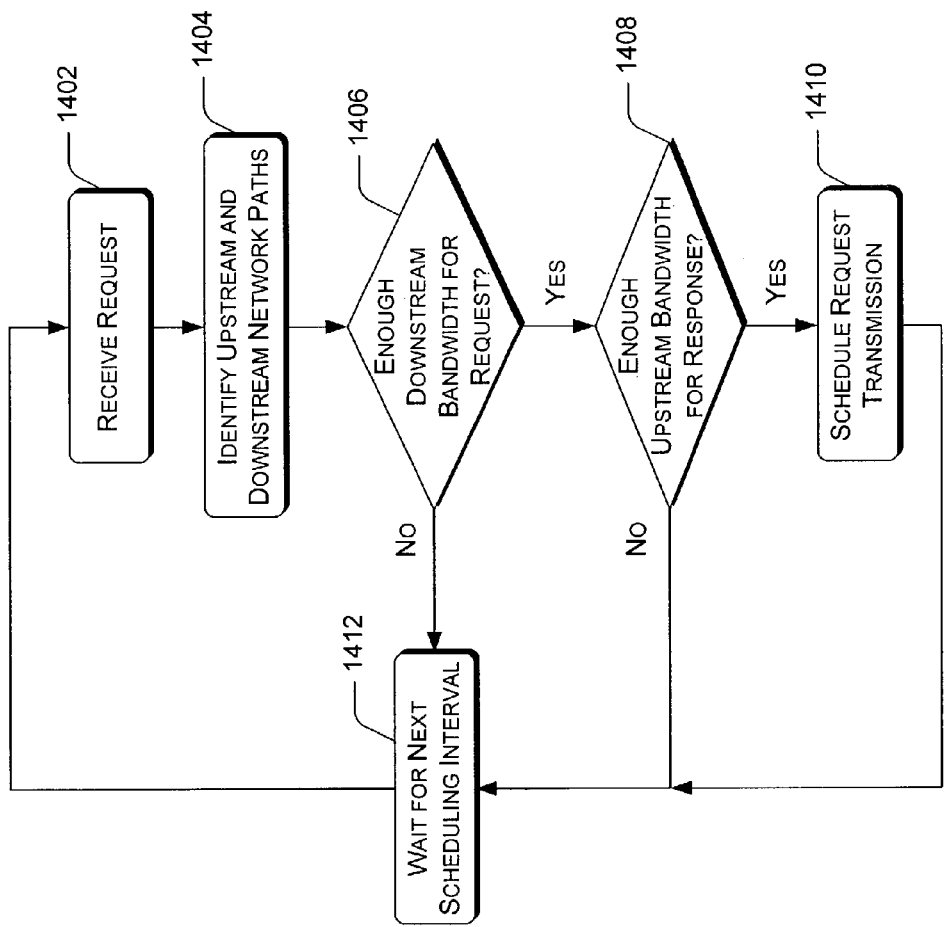
FIG. 14 is a flow diagram of an exemplary method for reducing network contention based on bandwidth when scheduling transmission of requests.

FIG. 14 illustrates an exemplary method for scheduling transmission of requests based on available bandwidth. The process shown in FIG. 14 is illustrated as a set of operations shown as discrete blocks. The process may be implemented in any suitable hardware, software, firmware, or combination thereof. The order in which the operations are described is not to be construed as a limitation.

At block 1402, IAG 208 receives a request from an application 206. For example, the received request is added to application request queue 502 or the request is received through an application request channel 902.

At block 1404, IAG 208 identifies the network paths associated with the request. A downstream network path is the path over which the request will be transmitted. An upstream network path is the path over which a response to the request may be received. For example, in an exemplary implementation, each request includes an upstream path ID, a downstream path ID, and an IP address associated with the set-top box to which the request is directed. In an exemplary implementation, in addition to identifying the network paths, IAG 208 may group received requests based on the identified upstream network path, for example, in a set of upstream path request queues 506.

At block 1406, IAG determines whether or not there is enough available downstream bandwidth to transmit the request. In an exemplary implementation, multiple requests may be scheduled for transmission during a particular time interval, and the available downstream bandwidth must be able to accommodate all of the requests that are scheduled from transmission across the particular downstream path during the particular time interval.

In an implementation in which requests are received through application request channels, each channel may have associated bandwidth allocations. For example, requests received through a particular channel may only be allowed to use up to a certain percentage of the available downstream bandwidth. In this case, in addition to verifying that there is enough downstream bandwidth to support all of the scheduled request transmissions, the IAG also verifies that the total bandwidth to be used for requests received through a particular application request channel does not exceed the specified downstream bandwidth allocation associated with the application request channel.

At block 1408, IAG determines whether or not there is enough available upstream bandwidth to accommodate an anticipated response to the request. In an exemplary implementation, each time a response is received, JAG adjusts a running average response size. This value is then used to determine the required upstream bandwidth. If the system is configured to allow pending requests to multiple set-top boxes that contend for the same upstream network path, the available upstream bandwidth must be able to accommodate anticipated responses to all of the pending requests to the contending set-top boxes.

As described above, in an implementation in which requests are received through application request channels, each channel may have associated bandwidth allocations. For example, responses to requests received through a particular channel may only be allowed to use up to a certain percentage of the available upstream bandwidth. In this case, in addition to verifying that there is enough upstream bandwidth to support all of the anticipated responses to contending pending requests, the IAG also verifies that the total upstream bandwidth to be used for responses to requests received through a particular application request channel does not exceed the specified upstream bandwidth allocation associated with the application request channel.

At block 1410, when it is determined that there is enough downstream bandwidth to support the request and that there is enough upstream bandwidth to support an anticipated response to the request, IAG 208 schedules the request for transmission. For example, in the above-described exemplary implementation, the request is transferred from an upstream path request queue 506 to a corresponding upstream path dispatch queue 508.

At block 1412, after the request is scheduled or if it is determined that there is not enough downstream bandwidth to support the request (the "No" branch from block 1406) or if it is determined that there is not enough upstream bandwidth to support an anticipated response to the request (the "No" branch from block 1408), IAG 208 waits for the next scheduling interval before beginning the process again.

FIG. 14 illustrates scheduling one request per scheduling interval, merely for ease of explanation. However, it is recognized that multiple requests may be scheduled during any given scheduling interval, depending on how the IAG 208 is configured.

Method for Estimating Request Response Size

Figure 15:
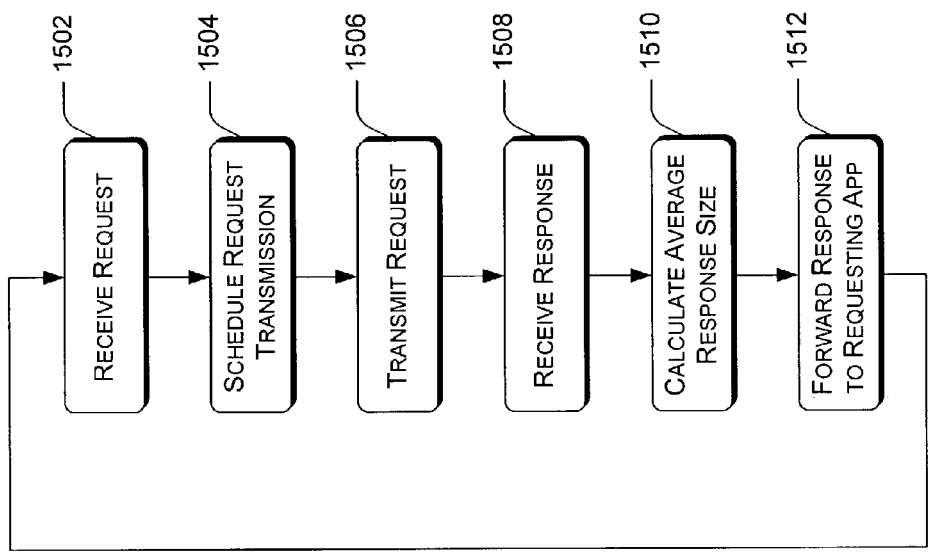
FIG. 15 is a flow diagram of an exemplary method for gathering data to be used to reduce network contention when scheduling transmission of requests.

FIG. 15 illustrates an exemplary method for gathering data to be used to reduce network contention when scheduling transmission of requests. The process shown in FIG. 15 is illustrated as a set of operations shown as discrete blocks. The process may be implemented in any suitable hardware, software, firmware, or combination thereof. The order in which the operations are described is not to be construed as a limitation.

At block 1502, IAG 208 receives a request from an application.

At block 1504, IAG 208 schedules transmission of the request. Example methods for scheduling request transmission are described above.

At block 1506, IAG 208 transmits the request (or, as described above, transfers the request to a network controller 210, which then causes the request to be transmitted).

At block 1508, IAG 208 receives a response to the request.

At block 1510, IAG 210 calculates an average response size. In an exemplary implementation, a running average response size is maintained, being re-calculated each time a response is received.

At block 1512, IAG 210 forwards the received response to the application from which the corresponding request was received.

Method for Handling Request Failures

Figure 16:
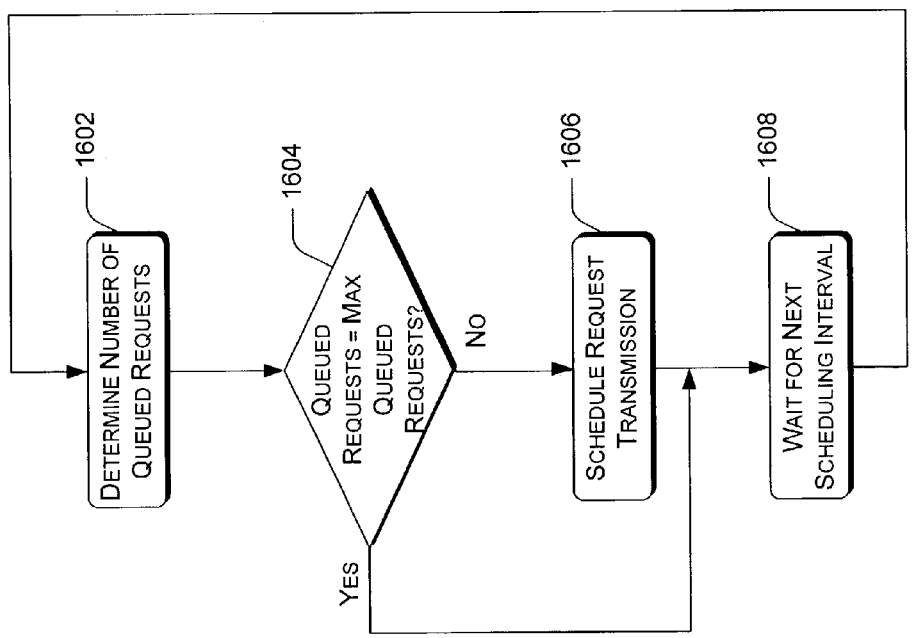
FIG. 16 is a flow diagram of an exemplary method for handling request failures.

FIG. 16 illustrates an exemplary method for handling request failures, such as timeouts, so as to not schedule an excessive number of pending requests. The process shown in FIG. 16 is illustrated as a set of operations shown as discrete blocks. The process may be implemented in any suitable hardware, software, firmware, or combination thereof. The order in which the operations are described is not to be construed as a limitation.

In an exemplary implementation, the process illustrated in FIG. 16 is performed each time the IAG 208 prepares to transfer a request from a USP request queue to a corresponding USP dispatch queue.

At block 1602, IAG 208 determines the number of pending requests in the particular USP dispatch queue.

At block 1604, IAG 208 compares the number of queued requests to a maximum number of queued requests. In an exemplary implementation, the maximum number is configurable to be, for example, an integer multiple of the number of requests that can be scheduled into the dispatch queue during a scheduling interval.

At block 1606, when it is determined that the number of pending requests that are queued is less than a maximum number of allowed pending requests (the "No" branch from block 1604), the request is scheduled as described in more detail above with reference to earlier figures.

At block 1608, when it is determined that the maximum number of pending requests are queued (the "Yes" branch from block 1604) or after a request has been scheduled, IAG 208 waits for the next scheduling interval, at which time processing continues as described above with reference to block 1602.

CONCLUSION

As described above, shared network path contention can be reduced by identifying client devices that share downstream and/or upstream network paths and managing both the downstream bandwidth across which requests are send and the upstream bandwidth across with responses are received. Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
    identifying a plurality of upstream network paths associated with a single downstream network path;
    establishing a plurality of upstream path request queues, wherein first and second upstream path request queues of the plurality of upstream path request queues are associated with first and second upstream network paths of the plurality of upstream network paths, respectively;
    receiving from one or more applications, first and second requests to be transmitted to first and second client devices, respectively;
    determining that the first client device is associated with the first upstream network path and that the second client device is associated with the second upstream network path;
    storing the first request in the first upstream path request queue and storing the second request in the second upstream path request queue; and
    performing a scheduling process, the scheduling process comprising:
        verifying that a bandwidth available on the downstream network path is larger than a data size of the first request;
        verifying that a bandwidth available on the first upstream network path is larger than a data size of an anticipated response to the first request; and
        moving the first request to a first dispatch queue.

2. The method as recited in claim 1 wherein the scheduling process further comprises:
    verifying that the bandwidth available on the downstream network path is larger than a combined data size of the first request and the second request;
    verifying that a bandwidth available on the second upstream network path is larger than a data size of an anticipated response to the second request; and
    moving the second request to a second dispatch queue.

3. The method as recited in claim 2 further comprising:
    transmitting the first and second requests from the first and second dispatch queues over the downstream network path.

4. A system comprising:
    one or more application request channels for receiving requests to be transmitted to client devices via a downstream network path, individual ones of the application request channels having an associated downstream path bandwidth allocation;
    a plurality of upstream request queues for grouping the requests based on upstream network paths over which responses to the requests may be received; and
    a bandwidth management system configured to schedule the requests from the plurality of upstream request queues for transmission to the client devices based, at least in part, on a request size and the downstream path bandwidth allocation associated with the application request channel through which the request was received.

5. The system as recited in claim 4 wherein individual ones of the application request channels have an associated upstream path bandwidth allocation and wherein the bandwidth management system is further configured to schedule the requests from the plurality of upstream request queues based on an estimated response size and the upstream path bandwidth allocation associated with the application request channel through which the request was received.

6. The system as recited in claim 4, implemented as a component of a cable television system headend.

7. A system comprising:
one or more application request channels for receiving requests to be transmitted to client devices via a downstream network path, individual ones of the application request channels having an associated upstream path bandwidth allocation;
a plurality of upstream request queues for grouping the requests based on upstream network paths over which responses to the requests may be received; and
a bandwidth management system configured to schedule the requests from the plurality of upstream request queues for transmission to the client devices based, at least in part, on an anticipated request response size and the upstream path bandwidth allocation associated with the application request channel through which the request was received.

8. The system as recited in claim 7 wherein individual ones of the application request channels have an associated downstream path bandwidth allocation and wherein the bandwidth management system is further configured to schedule the requests from the plurality of upstream request queues based on a request size and the downstream path bandwidth allocation associated with the application request channel through which the request was received.

9. The system as recited in claim 7, implemented as a component of a cable television system headend.

10. One or more computer-readable storage media comprising computer-executable instructions that, when executed, direct a computing system to perform a method comprising:
receiving a request through an application request channel;
identifying a client device to which the request is to be transmitted;
identifying an upstream network path associated with the client device;
queuing the request for transmission over a downstream network path based on the upstream network path that was identified;
identifying an upstream bandwidth allocation associated with the application request channel; and
scheduling the request for transmission based on a comparison between a portion of an available bandwidth associated with the upstream network path and a size of an anticipated response to the request, wherein the portion of the available bandwidth is determined based on the upstream bandwidth allocation associated with the application request channel.

11. The one or more computer-readable storage media as recited in claim 10, wherein the method further comprises estimating the size of the anticipated response to the request.

12. One or more computer-readable storage media comprising computer-executable instructions that, when executed, direct a computing system to perform a method comprising:
receiving a request through an application request channel;
identifying a client device to which the request is to be transmitted;
identifying an upstream network path associated with the client device;
identifying a downstream network path associated with the client device;
queuing the request for transmission over the downstream network path; and
identifying a downstream bandwidth allocation associated with the application request channel;
scheduling the request for transmission based on a comparison between a portion of an available bandwidth associated with the downstream network path and a size of the request, wherein the portion of the available bandwidth associated with the downstream network path is determined based on the downstream bandwidth allocation associated with the application request channel.

* * * * *